March 4, 1930.  C. W. FREDERICK  1,749,278
OPTICAL SYSTEM FOR USE IN PHOTOGRAPHIC COLOR PROCESSES
Filed Nov. 27, 1928
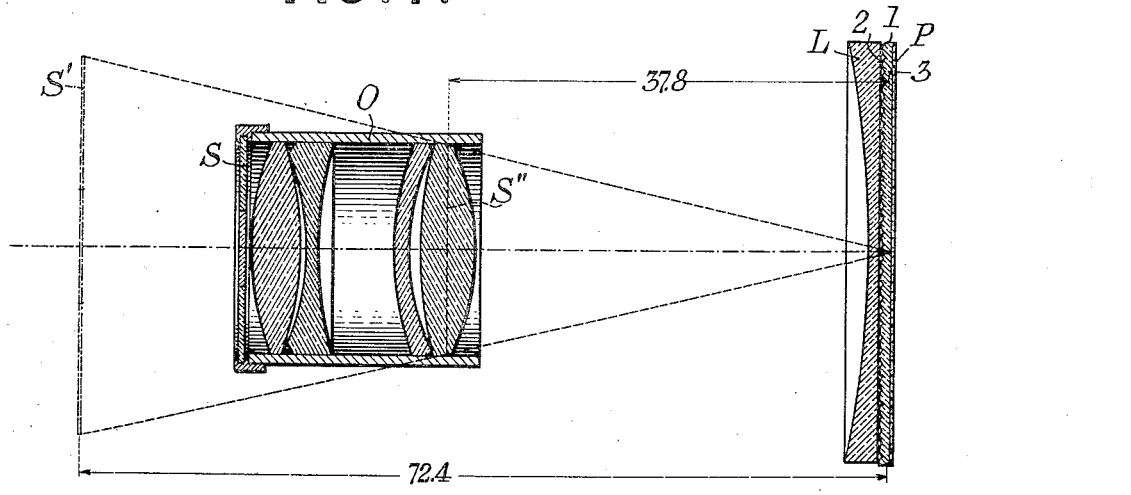
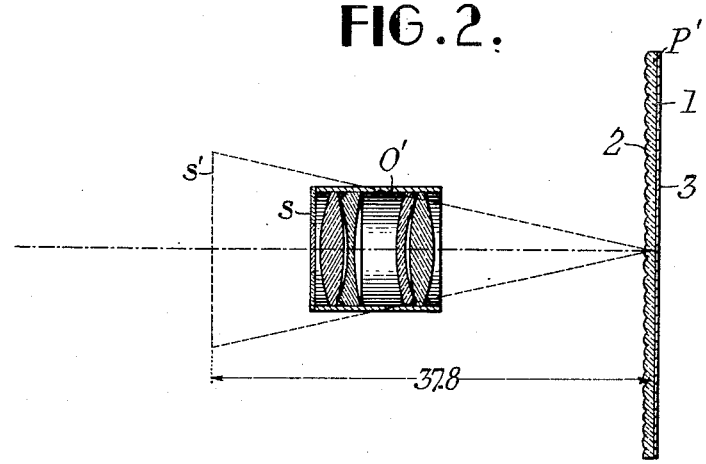
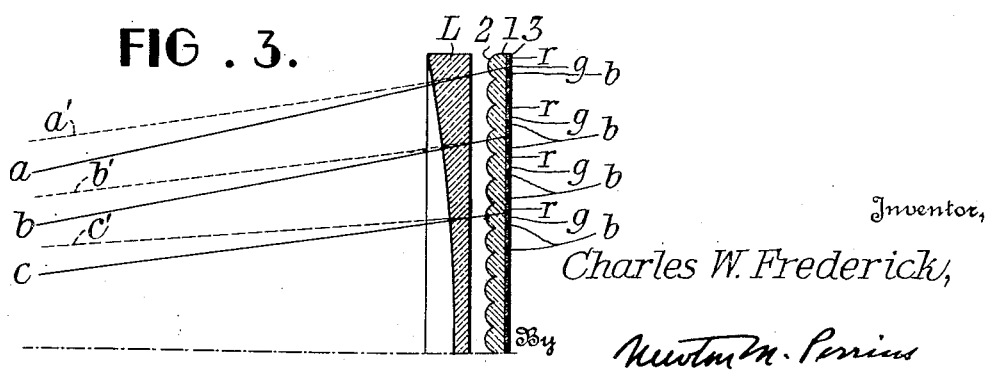
Inventor,
Charles W. Frederick,
By Newton N. Perrins
Attorney Patented Mar. 4, 1930

1,749,278

UNITED STATES PATENT OFFICE

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK

OPTICAL SYSTEM FOR USE IN PHOTOGRAPHIC COLOR PROCESSES

Application filed November 27, 1928. Serial No. 322,175.

This invention relates to optical systems for use in photographic color processes and more particularly to certain improvements in the optical systems disclosed in my Patent 1,685,600, granted Sept. 25, 1928, wherein there are described certain relations that must exist between the optical systems of cameras and projectors for their complementary use in a color process involving the use of minute lenticular elements on a sensitive film. As was there pointed out, the filters used in such a process should be so placed with respect to the rear focal planes of the respective systems that their images would subtend the same angle at that plane.

Because of physical limitations, it is sometimes difficult or impossible to locate filters in front of the objectives of existing equipment not originally intended for this process at the points required by theoretical considerations. For instance, the required point might be behind the front surface of the objective, or it would cut down the angle of the objective or introduce mechanical difficulties in mounting.

It is further desirable that such changes as may be made shall not materially affect the focal length of the system and that it be not necessary to remove a supplemental lens whenever the system is to be changed from color use to black and white or vice versa.

I have found that it is possible by proper choice and location of a supplemental lens to accomplish the desired ends.

Reference is made to the accompanying drawings for an explanation of the optical principles underlying my invention, the same reference characters being used to designate the same elements in the same figure.

Fig. 1 is a diagram of a projection system.

Fig. 2 is a diagram of a camera system.

Fig. 3 is another diagram showing the paths of certain rays.

In Fig. 1 is shown the same objective O as is disclosed in Fig. 3 of my earlier patent, this being made in accordance with the patent of Altman and myself 1,620,337 granted March 8, 1927, and having a focal length of 51.04 mm. and with the color screen S so positioned that its virtual image S' is positioned at a distance of 72.4 mm. from the rear focal plane P.

In Fig. 2 is shown a camera objective O' now on the market and also made in accordance with the Patent 1,620,337 and of just half the dimensions of objective O. Since the data of this objective is given fully in the two patents above mentioned, it need not here be repeated. It would be possible, as described in my Patent 1,685,600 to place a filter at such a point in front of objective O' that its virtual image would be 72.4 mm. from the rear focal plane, but if this were done, it would necessarily be placed well in front of the objective and its mount would vignette the view being photographed.

It is, therefore, necessary to modify one of the two systems so as to satisfy the conditions of my earlier patent without cutting down the view or materially altering the focal length of the system.

If a supplemental lens were placed in the plane P or P' the focal length of the objective would be unaffected. That is, it would project an image upon that plane from parallel rays. The front gauss point of the system would be moved. As such a supplemental lens is moved from plan P or P' toward the objective, it would affect the focal length of the objective more and more. However, if a weak lens were placed very close to the plane, it would affect only slightly the focal length of the objective, or the magnification of the image while it would materially affect the location of the front gauss point of the system. It is, therefore, possible by introducing such a weak supplemental lens in one system so to relocate the front gauss point that the screen may be readily placed in the most advantageous position.

One solution of the present problem would be to place a filter s closely in front of the objective O' at such a point that its virtual image s' will lie 37.8 mm. from the focal plane. As the focal plane passes through the film 1, having minute lenses 2 impressed in its front surface and a sensitive emulsion 3 on its rear surface, component images of the type peculiar to this process are formed in the emulsion.

If a plano concave lens L having a power of 13.4 diopters be placed with the plano surface substantially 2 mm. from the plane P, in Fig. 1, the front gauss point of the projection system as a whole is moved so far to the right that the virtual image S″ of the screen S is distant 37.8 mm. from the plane P, thus satisfying the requirements expressed in my Patent 1,685,600.

Another and perhaps simpler explanation may be given in another way. Referring to Fig. 3, the film 1 is shown on a much larger scale and the color component images $r$, $g$ and $b$ are shown behind the several lenses 2. These are images of the virtual image $s'$ as seen and projected by the several individual minute images. When projected, these same lenses project these images toward the same position from which they were taken, that is, toward a screen area positioned 37.8 mm. in front of the reference plane. The axes of several such minute projection beams are shown as proceeding along lines $a$, $b$, $c$. Due to the refraction of the negative lens L, they are so bent as to be directed along lines $a'$, $b'$, and $c'$ toward and focussed on the plane S′ distant 72.4 mm. from the reference plane. That is, the objective is considered apart from the supplemental lens and the supplemental lens refracts the beams so that the objective functions as before.

In the first explanation, the gauss points and virtual image of the system as a whole are considered, whereas, in the second, the gauss points and virtual image of the original objective are considered as unaltered and the effect of the supplemental lens as a separate system is described.

From the above, it is obvious that in general a negative lens would be used where the virtual image of the screen is too far from the reference plane and that a positive lens would be used if it were too near.

In the above example, the effect of the introduction of the negative lens is to lengthen the focal length of the system as a whole to 53 mm. This does not affect the magnification of the image materially. The objective would, of course, have to be focussed as usual to project an image in focus on a screen.

In general, I prefer to position the supplemental lens away from the film by a distance not over ten percent of the focal length of the objective.

It is to be noted that the effect of the supplemental weak lens is to bring the image of the screen to a predetermined finite position in front of the focal plane, in accordance with the requirements of the complementary system; and that it is possible to locate the filter in front of the objective.

It is evident from the above discussion that my invention, in certain of its aspects is applicable to filters otherwise positioned.

I contemplate as included within my invention such modifications and equivalents as fall within the scope of the appended claims.

Having thus described my invention, what I claim as new and desire to secure by Letters Patent is:

1. An optical system for use in a photographic color process involving the use of a photographic layer having microscopic image-forming elements associated therewith and comprising an objective, a polychromatic screen in front of the objective and a supplemental lens between the objective and the focal plane of the system.

2. An optical system for use in a photographic color process involving the use of a photographic layer having microscopic image-forming elements associated therewith and comprising an objective, a supplemental lens between the objective and the focal plane of the system and a polychromatic screen in front of the objective, the virtual image of the screen being at a predetermined finite position in front of the focal plane of the system.

3. An optical system for use with a complementary optical system in the taking and projecting of color photographs by the use of photographic layers having associated therewith numerous microscopic image-forming elements and comprising an objective, a polychromatic screen mounted in front of the objective and a supplemental lens mounted in front of the rear focal plane of the system by a distance not exceeding ten percent of the focal length of the objective.

4. An optical system for use, with a complementary optical system comprising an objective and a polychromatic screen the virtual image of which occupies an ascertained position with respect to the rear focal plane of the objective, in the taking and projecting of color photographs by the use of a photographic layer having associated therewith numerous microscopic image-forming elements, and comprising an objective, a weak supplemental lens positioned in front of the rear focal plane by a distance not exceeding ten percent of the focal length of the objective, and a polychromatic screen mounted at such a position that its virtual image is distant from the rear focal plane of the system by the same distance that the virtual image of the screen in the complementary system is distant from the rear focal plane thereof.

5. An optical system for use, with a complementary optical system comprising an objective and a polychromatic screen the virtual image of which occupies an ascertained position with respect to the rear focal plane of the objective, in the taking and projecting of color photographs by the use of a photographic layer having associated therewith numerous microscopic image-forming elements, and comprising an objective, a weak supplemental lens positioned close to and in front of the rear focal plane of the system, and a trichromatic screen positioned in front of the objective at that point which is conjugate to a point distant from the rear focal plane of the system by the distance which the said virtual image in the complementary system is distant from the rear focal plane of said complementary system.

6. An optical system for use in projecting, from a photographic layer having associated therewith numerous microscopic image-forming elements, of minute images formed, therein by a camera system comprising an objective and a polychromatic screen the virtual image of which occupies an ascertained position with respect to the rear focal plane of the objective, said optical system comprising an objective, a supplemental lens close to and in front of the rear focal plane of said system and a polychromatic screen mounted in front of said objective at such a point that its virtual image is distant from the rear focal plane of the system by the same distance that the virtual image in the camera system is distant from the rear focal plane of the camera objective.

7. An optical system for use in projecting, from a photographic layer having associated therewith numerous microscopic image-forming elements, of minute images formed therein by a camera system comprising an objective and a polychromatic screen the virtual image of which occupies an ascertained position with relation to the rear focal plane of the objective, said optical system comprises an objective of greater focal length than said camera objective, a weak negative lens mounted in front of the rear focal plane of the system by a distance not exceeding ten percent of the focal length of the objective, and a polychromatic screen mounted in front of the objective at such a point that its virtual image with respect to the system is distant from the rear focal plane of the system by the same distance that the virtual image in the camera system is distant from the rear focal plane of the camera objective.

8. Complementary optical systems for use respectively in the taking and projecting of color photographs by the use of photographic layers having associated therewith numerous microscopic image-forming elements and comprising two objectives of different focal lengths and two similar polychromatic screens, one screen being mounted in front of each objective, the positions of said screens being such that the virtual images thereof are of the same size and have the same positions relative to the rear focal planes of the systems and one of the systems including a supplemental lens close to and in front of its rear focal plane.

9. An optical system for use in projecting, from a photographic layer having associated therewith numerous microscopic image-forming elements, of minute images formed therein by a camera system comprising an objective and a polychromatic screen the virtual image of which occupies an ascertained position with respect to the rear focal plane of the objective, said optical system comprising an objective, a weak supplemental lens in front of the focal plane of the optical system by a distance less than ten percent of the focal length of the objective and a polychromatic screen mounted at such a point that its virtual image is distant from the rear focal plane of the system by the same distance that the virtual image in the camera system is distant from rear focal plane of the camera objective.

10. Complementary optical systems for use in the taking and projecting of color photographs by the use of photographic layers having associated therewith numerous microscopic image-forming elements and comprising two objectives of different focal lengths, each system including one objective and a polychromatic screen associated therewith, and one system including a weak supplemental lens in front of its rear focal plane by a distance less than ten percent of the focal length of the system, the positions of the screens in the systems being such that the virtual images thereof are of the same size and have the same positions relative to the rear focal planes of the systems.

Signed at Rochester, New York, this 22nd day of November, 1928.

CHARLES W. FREDERICK.